March 18, 1958    H. D. BURKHALTER    2,827,280
RESILIENT BUMPER
Filed July 1, 1954
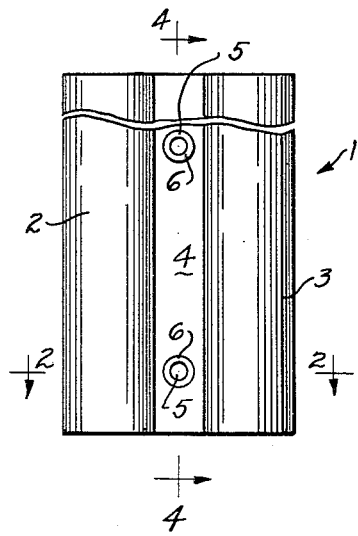
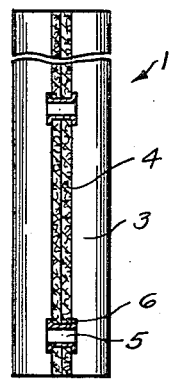
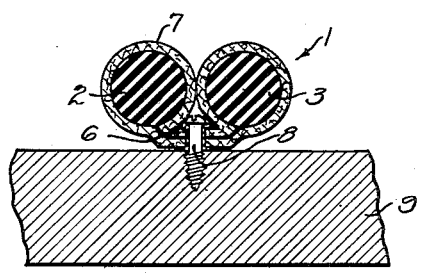
INVENTOR.
HARRY D. BURKHALTER

2,827,280

RESILIENT BUMPER

Harry D. Burkhalter, Dayton, Ohio

Application July 1, 1954, Serial No. 440,875

1 Claim. (Cl. 267—1)

(Granted under Title 35, U. S. Code (1952), sec. 266)

The invention described herein may be manufactured and used by or for the United States Government for governmental purposes without payment to me of any royalty thereon.

This invention relates to improved buffer or bumper devices of the type used on aircraft maintenance stands, shelters, platforms, cowling, and propeller racks, etc.

An object of the invention is the provision of a resilient bumper which is flexible and made in strip form, which is easily and conveniently stored and may be cut off in required lengths, having means incorporated therein for effecting "blind" fastening of the bumper to the desired supporting surface.

A further object is the provision of a resilient bumper comprising parallel substantially cylindrical resilient cushion members connected throughout their length by a flat flexible web member located in a plane passing through the centers of the resilient cushion whereby the securing of the web member to a supporting surface flexes the resilient cushion members over the web into substantially juxtaposed relation to close the exposed space between the two resilient cushion members.

A further object is the provision of a multiple resilient bumper member in strip form comprising at least two resilient substantially cylindrical elongated cushion members connected together throughout their length by a narrow thin web member having a width not exceeding the diameter of the cushion members with means formed in the connecting web member at predetermined spaced intervals throughout its length for receiving fastening means therethrough, whereby in fastening the bumper to a supporting substantially flat surface, the fastening means is adapted to draw the web member into contact with the surface to displace the cylindrically cushioned member outwardly and toward each other into abutting relation above the fastening means to provide a juxtaposed cushioning bumper member above and inclosing the fastening means.

A further object is the provision of a bumper or resilient cushion device in strip form which is reversible when worn to expose the other previously non-exposed surfaces of the cylindrical cushion members to additional wear thus substantially doubling the life and wearing qualities of the bumper device.

A further object is the provision of non-flexible hole reinforcing means surrounding the holes in the web which acts in reinforcing the portion of the web and drawing the web portion surrounding the fastening holes between the cylindrical cushion members into firm contact with the supporting surface to which the bumper device is fastened.

Other objects and advantages will become apparent from the following description and accompanying drawings in which like reference characters refer to like parts in the several figures of the drawings.

In the drawings:

Figure 1 is a plan view of a portion of a bumper strip incorporating my invention, before the application thereof to a supporting surface.

Figure 2 is a transverse section taken on a line 2—2 of Figure 1.

Figure 3 is a view similar to Figure 2 showing the bumper device secured in position on a supporting surface.

Figure 4 is a longitudinal sectional view of a portion of the bumper strip taken on the plane indicated by line 4—4 in Figure 1.

Referring to the drawing the reference numeral 1 indicates the bumper strip generally comprising a pair of spaced resilient, preferably cylindrical, elongated resilient bumper members 2 and 3 connected together throughout their lengths by a flexible web member 4, the web member as shown being comparatively thin, less than one-half the radius of the cylindrical bumper members 2 or 3, and having a width throughout its length which is less than the diameter of the resilient bumper member, as shown in the drawing, particularly Figures 1 and 2. In the above construction as described the bumper is a unitary article which may be made from flexible resilient material such as rubber, plastic, or felt, having a pair of cylindrical bumper members, spaced apart less than the diameter of one of the bumpers, with a flat, comparatively thin integral web disposed initially in a plane which passes through the central axes of both of the bumper members.

The web member is preferably provided with a row of uniformly spaced apertures throughout its length midway between the adjacent connected sides of the cylindrical bumper members as indicated at 5, and for reinforcing the apertures 5 grommets 6 are provided.

As shown in the drawing the resilient bumpers 2 and 3 are inclosed in a flexible reinforcing tubular sheath or closure which is indicated at 7 which also forms the web portion 4, the inner opposite faces of the sheath being secured together intermediate the adjacent edges of the rubber or cylindrical resilient "cores" of the bumpers by the reinforcing grommets 6, the adjacent or juxtaposed faces, between the cores also being secured together, preferably under pressure, by a suitable flexible adhesive cement, Figures 1 and 2 illustrate my improved twin bumper in strip form before its application, and may be stored in roll form and cut off at the length desired.

Figure 3 shows in cross-section an "application." In applying the bumper screws (or nail) fasteners 8, are inserted through the apertures 5 in the grommets 6 and driven home in the support 9 on which it is desired to position the bumper. The head of the fastener 8 draws the web portion down tight against the surface of the support 9, rolling the cylindrical bumper members on the surface toward each other somewhat as shown in Fig. 3 and over the connected edges of the web 4, thus covering, or tending to cover, the exposed outer ends of the fasteners 8, preventing the contact of a surface which engages the bumper from contacting with, and being marred by the fasteners.

When the exposed bumper surfaces become worn or damaged the fastenings can be withdrawn by inserting a screwdriver or other suitable tool between the cylindrical bumper members 2 and 3, to spread them and remove the fasteners therebetween, after which the strip can be inverted and the fasteners replaced as before, thus substantially doubling the life and wearing qualities of the bumper strip.

It should be noted that an application of increasing pressure on the exposed cylindrical faces of the resilient bumper members 2 and 3 tends to spread the adjacent sides thereof toward each other over the fasteners 8 and grommets 6, affording increasing positive protection for a contacting or engaging surface from injury by the fasteners as the pressure increases. Also the flanges of the reinforcing grommets 6 function as stiffening members for the portions surrounding the fastening members for securing the greater portion of the webs flat against the supporting surface 9.

I claim:

A flexible twin bumper strip comprising a pair of elongated, flexible rubber-like cylindrical cushion members disposed in spaced side-by-side relation, a flexible sheath-like casing enclosing both of said cushion members, flattened intermediate the cushion members in a plane extending longitudinally of the strips substantially through the axial centers of both of the cylindrical cushion members with the adjacent flattened portions of said casings cemented to each other to provide an enclosing casing for said cushion members and a flat spacing web connecting the cushion members together at their adjacent longitudinal edges, said flattened and cemented intermediate spacing web portions being formed with apertures at spaced intervals throughout their length substantially midway between the spaced cushion members, and a grommet fitted in each of said apertures having annular flanges on its opposite sides engaging the opposite sides of said spacing web portions for holding the upper and lower surfaces of said flattened spacing web portions together intermediate said cushion members and receiving a fastener member therethrough to draw said cushion members and said web portions down on a supported surface and preventing contact between said web surfaces and the fastener member.

References Cited in the file of this patent

UNITED STATES PATENTS

| | | |
|---|---|---|
| 800,883 | Schuyler | Oct. 3, 1905 |
| 1,625,764 | Bosley | Apr. 19, 1927 |
| 1,736,885 | Morrill | Nov. 26, 1929 |
| 1,861,322 | Schemmel | May 31, 1932 |
| 2,347,158 | Spraragen | Apr. 18, 1944 |
| 2,560,308 | Spraragen | July 10, 1951 |
| 2,686,747 | Wurtz et al. | Aug. 17, 1954 |